(12) United States Patent
Iwami et al.

(10) Patent No.: US 7,434,382 B2
(45) Date of Patent: Oct. 14, 2008

(54) SKATE FOR CABLE PROTECTION GUIDE

(75) Inventors: Tsutomu Iwami, Osaka (JP);
Toshimitsu Sakai, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 367 days.

(21) Appl. No.: 11/414,813

(22) Filed: May 1, 2006

(65) Prior Publication Data
US 2007/0018146 A1 Jan. 25, 2007

(30) Foreign Application Priority Data
Jul. 19, 2005 (JP) .............................. 2005-208549

(51) Int. Cl.
*F16G 13/16* (2006.01)
(52) U.S. Cl. .................. 59/78.1; 248/51; 191/12 C
(58) Field of Classification Search .................. 59/78.1; 248/49, 51; 212/267; 191/12 C
See application file for complete search history.

(56) References Cited

U.S. PATENT DOCUMENTS

| | | | | |
|---|---|---|---|---|
| 5,649,415 | A * | 7/1997 | Pea | 59/78.1 |
| 7,310,935 | B2 * | 12/2007 | Worms | 59/78.1 |
| 7,343,731 | B2 * | 3/2008 | Iwami et al. | 59/78.1 |
| 7,373,770 | B2 * | 5/2008 | Iwami et al. | 59/78.1 |
| 2005/0155337 | A1 * | 7/2005 | Worms | 59/78.1 |
| 2007/0277499 | A1 * | 12/2007 | Iwami et al. | 59/78.1 |

FOREIGN PATENT DOCUMENTS

| | | | |
|---|---|---|---|
| EP | 1193420 | * | 4/2002 |
| JP | 57-016273 | * | 1/1982 |
| JP | 10-220533 | * | 8/1998 |

OTHER PUBLICATIONS

U.S. Appl. No. 11/472,649, Tsutomu Iwami.

* cited by examiner

*Primary Examiner*—David B Jones
(74) *Attorney, Agent, or Firm*—Howson & Howson LLP (57) ABSTRACT

A skate for a flexible cable guide comprises a series of interconnected skate units, each comprising a pair of parallel rails with rollers, the rails being connected by transverse connecting bars. A connecting block is provided with two holes. A connecting bar of one of skate units extends through one of the two holes. The other hole has a longitudinal entry slot for receiving a narrowed portion of a bar of the other skate unit. The narrowed portion is formed by providing one or more flat portions on the bar, disposed at a 45° angle with respect to the longitudinal direction of the skate, in order to require manipulation of the connecting block for engagement and disengagement of the bar having a narrowed portion from the connecting block.

10 Claims, 8 Drawing Sheets

SKATE FOR CABLE PROTECTION GUIDE

CROSS-REFERENCE TO RELATED APPLICATION

This application claims priority on the basis of Japanese patent application 2005-208549, filed Jul. 19, 2005. The disclosure of Japanese application 2005-208549 is hereby incorporated by reference.

FIELD OF THE INVENTION

This invention relates generally to cable guides for protecting and guiding flexible cables. More specifically, the invention relates to an improved skate for interposition between two facing parts of a folded cable guide in order to promote smooth flexing movement of the cable guide, and to prevent damage resulting from frictional contact between the parts, thereby extending the useful life of the cable guide.

BACKGROUND OF THE INVENTION

The term "flexible cable," as used herein, means any flexible, elongated, energy or fluid-conducting device, such as a cable composed of one or more electrical wires or optical fibers, a fluid-conducting hose for conducting compressed air or a hydraulic fluid used as a medium for transmission of motive power, a flexible conduit used to convey a gas, a liquid, or another fluid material for use in a machine or industrial process, a flexible actuator such as a Bowden wire, or a flexible rotating shaft with or without a non-rotating sheath. Such flexible cables are used, for example, to connect relatively moving parts of a machine such as a machine tool, an industrial robot, or a conveyor or other material-handling or material-carrying machine, such as a hoist or other machine used in a civil engineering application.

When a flexible cable is connected to a moving part, torsion, flexion, and tensile forces applied to the cable as a result of movement of the moving part can result in damage to, or distortion of, the cable. Cable guides have been used to avoid such damage and distortion.

Figure 10:
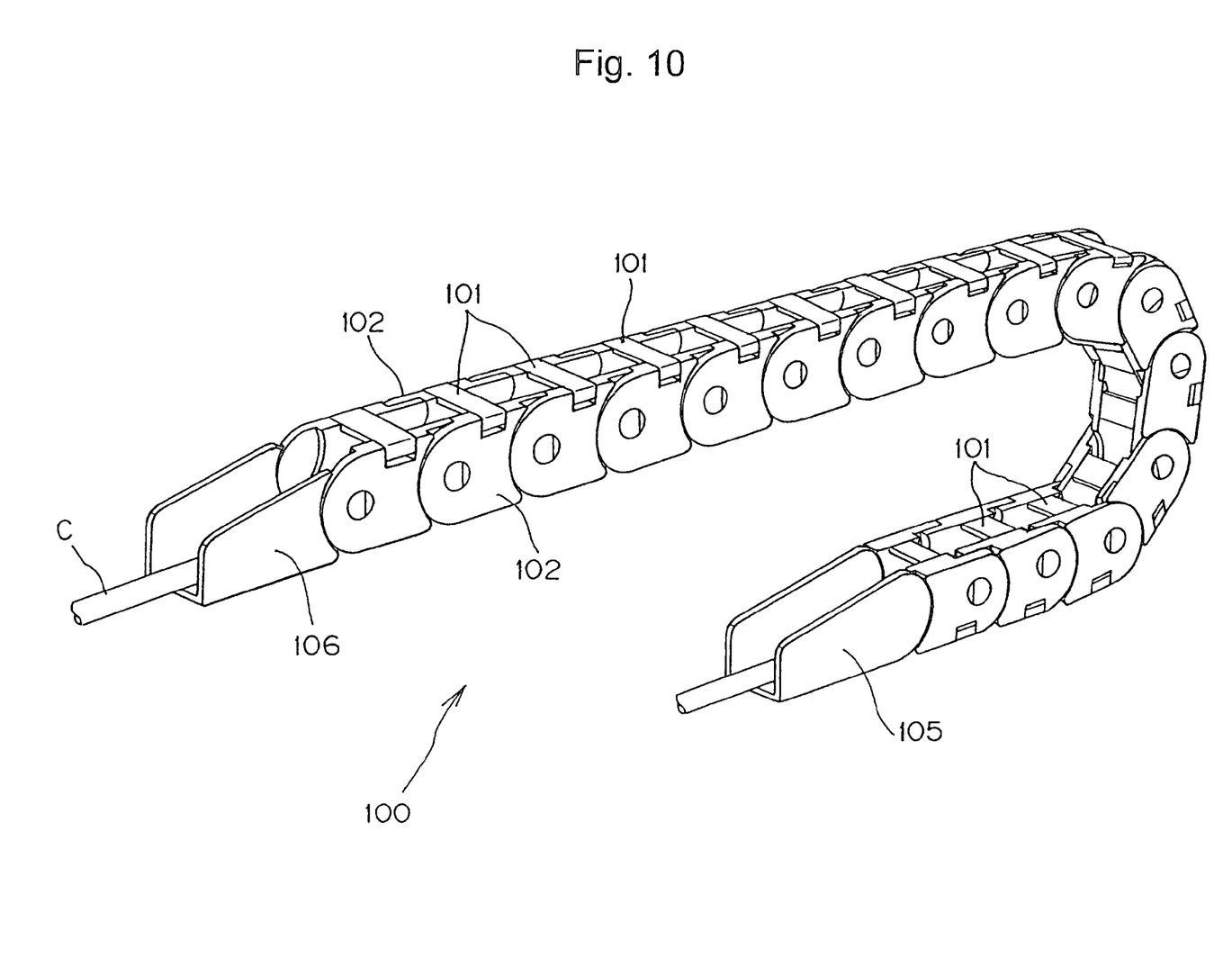
FIG. 10 is a perspective view showing a cable protection guide.

As shown in FIG. 10, a typical cable guide 100 is composed of a number of links, each comprising a pair of side plates 102 disposed on both sides of a cable C and connecting plates 101 connecting the side plates. The connecting plates 101 are provided both above and below the cable, and together with the side plates 102, form an elongated channel through which the cable extends. The side plates 102 on each side of the guide are hinged to one another so that the guide can bend at least in a single plane. Usually, the flexion of the guide is limited to a specific minimum radius of curvature in order to avoid kinking of the cable C.

Figure 8:
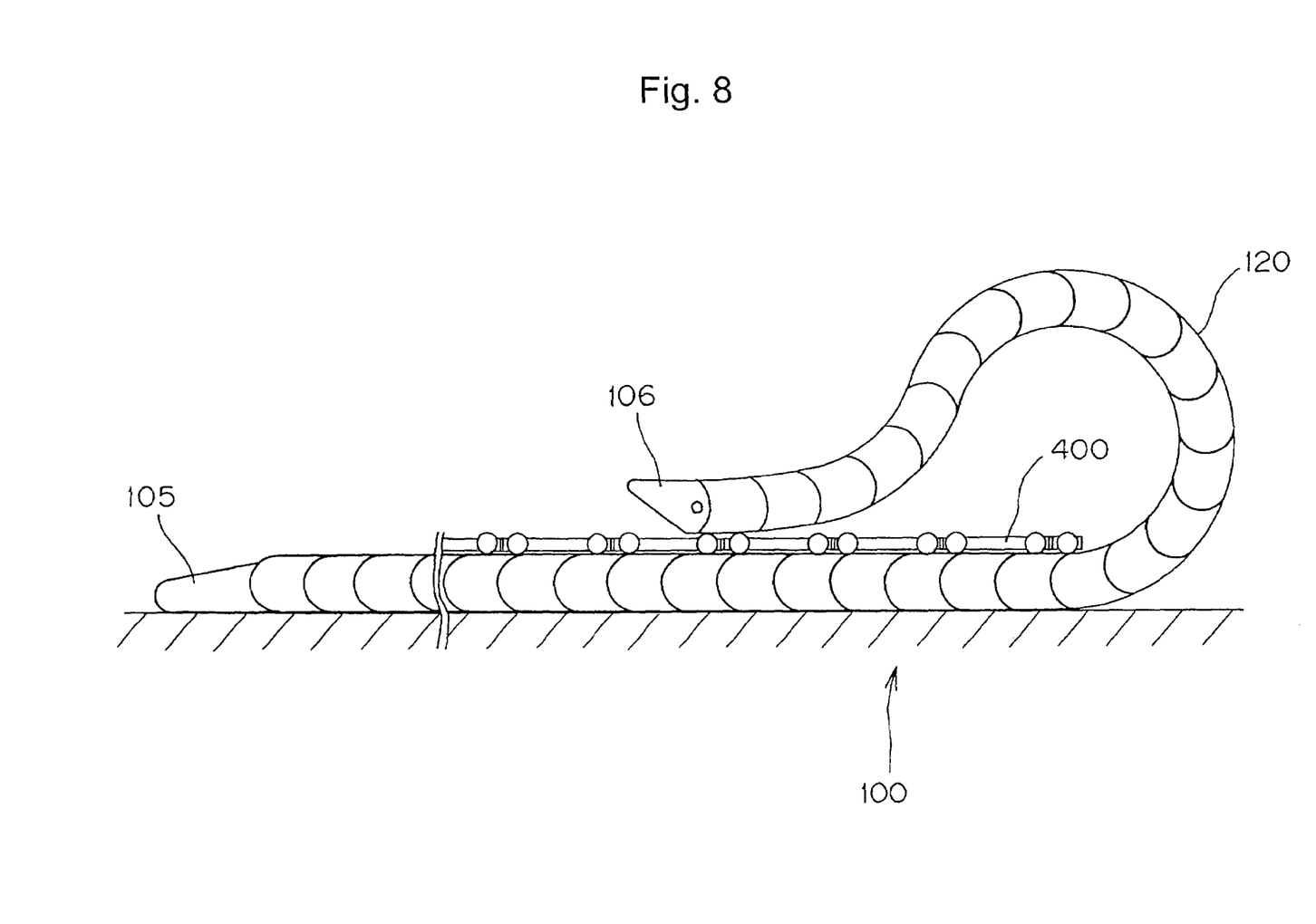
FIG. 8 is a side elevation illustrating a skate according to the invention interposed between two facing parts of a folded cable protection guide.

Typically, the cable guide has a fixed end 105 and a moving end 106. Where a cable guide of sufficient length is folded on itself by a bend 120 as shown in FIG. 8, it is possible for two portions of the guide to come into face-to-face contact with each other. Friction between the contacting parts of the guide can obstruct smooth reciprocating motion. Moreover, frictional contact over time can cause wear and eventual breakage of the cable guide. Breakage can also result from interference between projecting portions of the two facing parts of the guide.

On Jul. 8, 2005, one of the inventors of the invention filed a Japanese patent application, 2005-200236, describing a skate for interposition between the facing parts of a folded cable guide. An example of the skate disclosed in the Japanese patent application is depicted in FIGS. 8, 9(a) and 9(b).

This skate 400 is composed of a series of interconnected units that can be sandwiched between facing parts of a bent cable guide 100, as shown in FIG. 8, to prevent the parts of the cable guide from coming into direct contact with each other.

Figure 9:
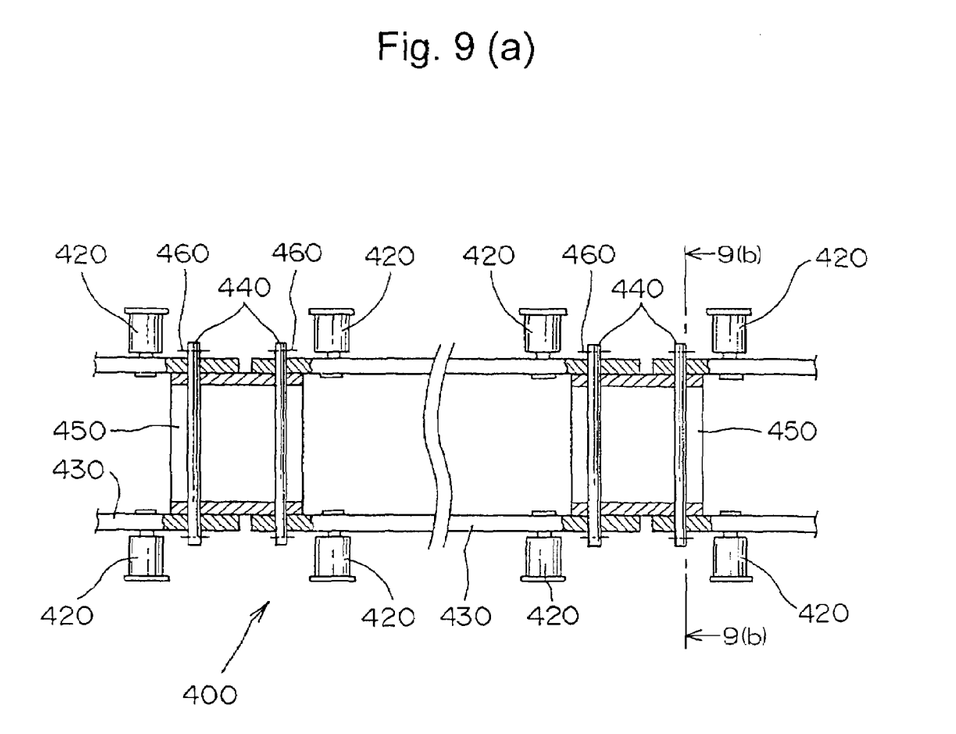
FIG. 9(a) is a top view of a skate previously proposed by one of the inventors of this invention.
FIG. 9(b) is a cross-sectional view taken on section plane 9(b)-9(b) in FIG. 9(a)

As shown in FIGS. 9(a) and 9(b), the skate 400 is composed of a series of interconnected skate units in aligned, sequential relationship. Each skate unit comprises a pair of parallel rails 430, and each rail has a pair of rollers 420 which extend laterally outward. The rollers are rotatable on pins fixed to the rails, and the diameters of the cylindrical parts of the rollers are greater than the height of the rails. The rollers are also provided with flanges at their outer ends, which keep the skate units aligned with the cable guide. The parallel rails 430 of each skate unit are maintained at a predetermined spacing by U-shaped connecting blocks 450, which also serve to connect the skate units to one another. To this end, connecting pins 440 extend, laterally with respect to the longitudinal direction of the skate, through the side walls of the blocks 450, and through holes formed in the rails 430, and are secured by Cotter pins 460 or by other suitable devices. The connecting pins allow the skate units to articulate freely relative to the connecting blocks and relative to one another at least about the axes of the connecting pins. The articulation of the skate units allows a full length skate to be used even when both of the facing parts of the cable guide bend during use.

The skate 400 can be built to any desired length by interconnection of an appropriate number of skate units. However, the assembled skate unit can be difficult to carry, especially if it is composed of a large number of skate units. Moreover, since the skate units are connected to the connecting blocks 450 by pins 440, which are secured by additional devices such as Cotter pins 460, it is difficult to assemble the skate by connecting the skate units to the connecting blocks, and also difficult to disassemble the skate unit by disconnecting the skate units from the connecting blocks.

This invention enables the skate units to be connected and disconnected more easily, so that the skate can be more readily assembled, and so that the skate can be easily disassembled for transport from one place to another.

SUMMARY OF THE INVENTION

The skate according to the invention is made up of a plurality of skate units disposed in aligned, sequential relationship to one another along a longitudinal direction. Each skate unit comprises a pair of rails in laterally spaced, parallel relationship, and a pair of connecting bars, each extending from one rail to the other. Rollers are mounted on the rails for rolling engagement with a flexible protective cable guide. Two adjacent skate units are connected by a connecting block having first and second through holes, the second of the through holes having a longitudinal entry slot along its full length, the width of the entry slot being less than the diameter of the slotted through hole. A first connecting bar of one skate unit extends through the a first through hole of the connecting block, and a second connecting bar of the other skate unit extends through the second through hole of the connecting block. Both bars are preferably in the form of elongated circular cylinders having diameters slightly less than the diameters of the holes in the block through which they extend, except that the second connecting bar has a narrowed portion, preferably along only a part of its length. The length of the narrowed portion is preferably greater than the length of the slot, but its width is narrower than the width of the slot. The narrowed portion can enter the slot for engagement of the second connecting bar with the second hole and exit through the slot for disengagement of the second connecting bar from the second hole.

Preferably, the second hole is a circular, cylindrical hole, the width of the slot is less than the diameter of the second hole, and the narrowed portion of the second connecting bar has a cross-section having a width dimension in one direction narrower than the width of the slot, and a width dimension in another direction greater than the width of the slot but not greater than the diameter of the second hole.

Preferably, the slot has two opposed walls, at least one of which intersects the cylindrical hole. In this case, the spacing of the opposed walls from each other is less than the diameter of the second hole, and the narrowed portion of the second connecting bar has a cross-sectional shape defined by at least one circular, circumferential portion having a radius of curvature approximately equal to the radius of curvature of the circular, cylindrical hole, and at least one flat portion, the width of the narrowed portion of the bar, measured in a direction perpendicular to the flat portion being less than the spacing of the opposed walls. Preferably, the flat portion is disposed at an oblique angle with respect to the longitudinal direction of the skate, and the slot establishes an opening in the second hole facing in the longitudinal direction.

In one embodiment, the both of the opposed walls of the slot intersect the cylindrical hole, and the narrowed portion of the second connecting bar has a cross-sectional shape defined by two, opposite, circular, circumferential portions, each having a radius of curvature approximately equal to the radius of curvature of the circular, cylindrical hole, and two opposite flat portions.

In another embodiment, one of the walls of the slot intersects the cylindrical hole, and the other wall of the slot is tangent to the cylindrical hole. In this case, the narrowed portion of the second connecting bar has a cross-sectional shape defined by one circular, circumferential portion having a radius of curvature approximately equal to the radius of curvature of the circular, cylindrical hole, and one flat portion.

The slotted connecting block provides for simple connection and disconnection of the skate units, enabling a skate to be transported easily, and to be assembled in a desired length, and disassembled, where necessary, at the location of the machinery in which it is to be incorporated.

DETAILED DESCRIPTION OF THE PREFERRED EMBODIMENT

Figure 1:
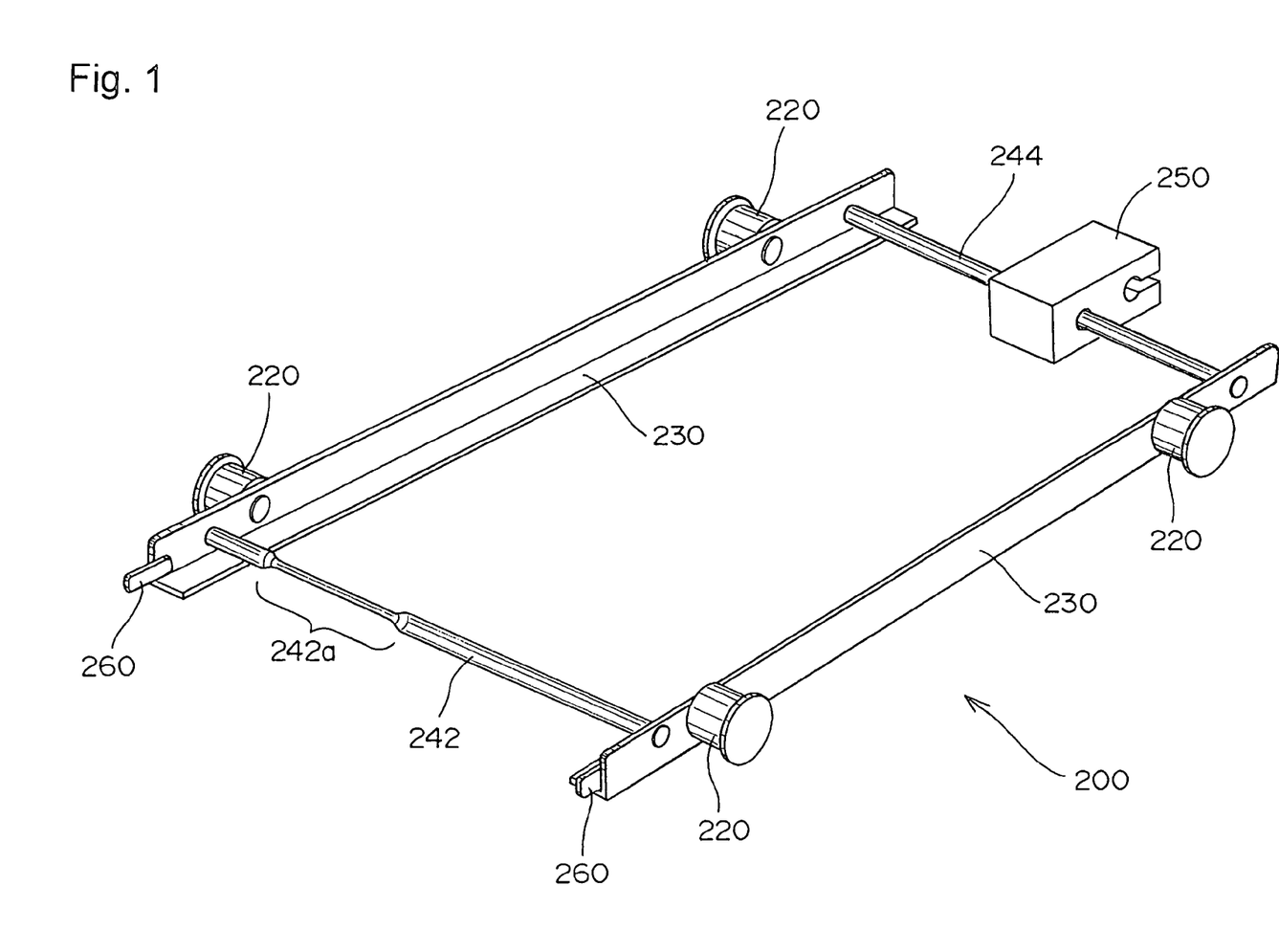
FIG. 1 is a perspective view of a skate unit according to the invention.

As shown in FIG. 1, a skate unit 200 comprises a pair of side rails 230, each rail having an L-shaped cross-section and provided with two rollers 220, rotatable on pins secured to a vertical portion of the rail. The rollers have a diameter slightly greater than the height of the side rails, and thus can be sandwiched between opposed parts of a folded cable guide. The rails are fixed to, and connected by, two transversely extending connecting bars 242 and 244, which maintain the side rails 230 at a predetermined spacing. Both bars are preferably in the form of elongated circular cylinders except that bar 242 has a narrowed portion, preferably along only a part of its length.

Figure 2:
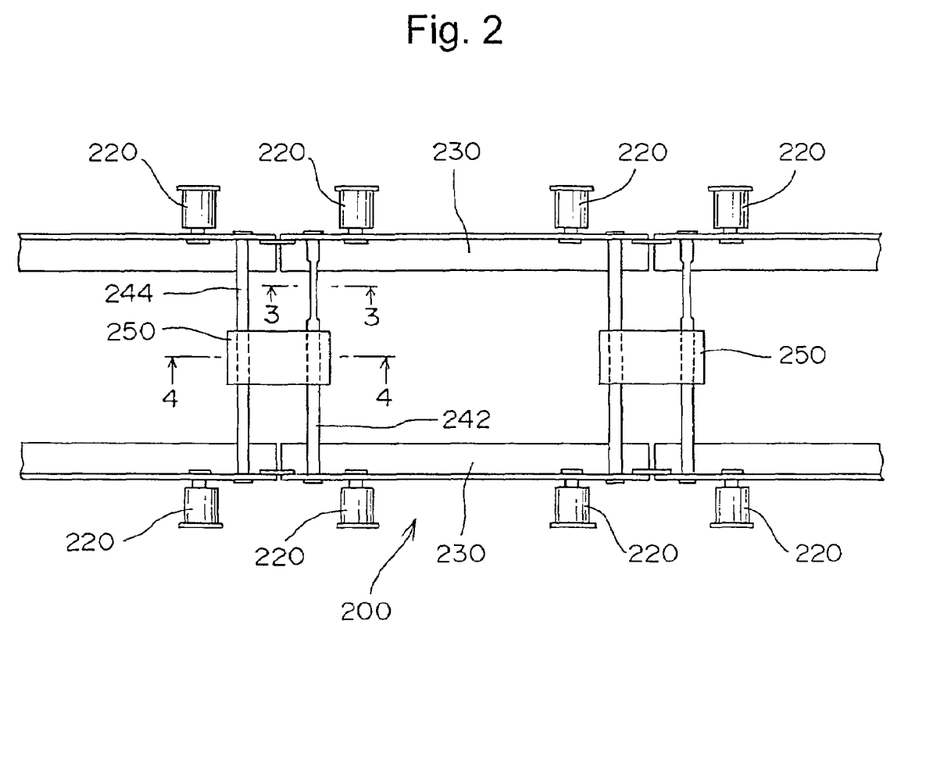
FIG. 2 is a top plan view of a skate composed of plural skate units connected to one another in series.

Adjacent skate units are connected together by connecting blocks 250, each of which makes a connection from a connecting bar 244 of one skate unit to a connecting bar 242 of an adjacent skate unit, as shown in FIG. 2. Elements 260 in FIG. 1 are lateral shift prevention members for preventing the lateral shift of adjacent skate units when skate units 200 are connected to one another.

Figure 3:
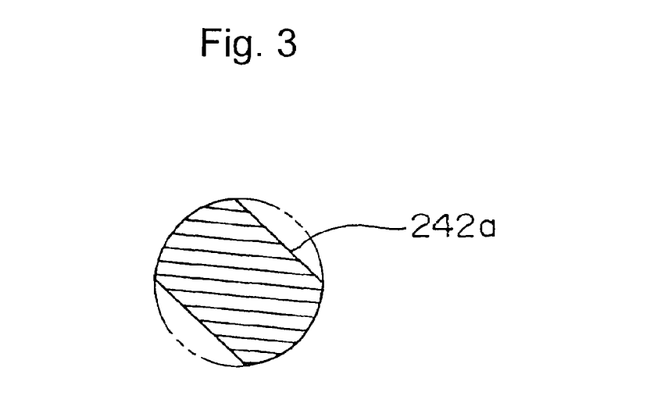
FIG. 3 is a cross-sectional view taken on section plane 3-3 in FIG. 2.
Figure 4:
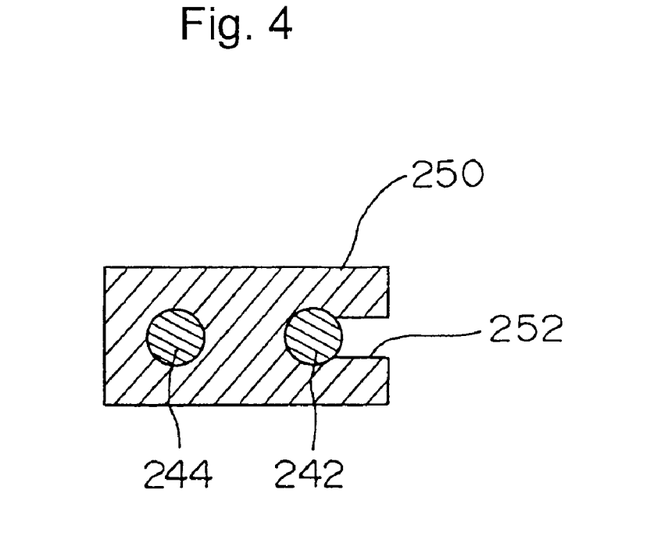
FIG. 4 is a cross-sectional view taken on section plane 4-4 in FIG. 2.
Figure 5:
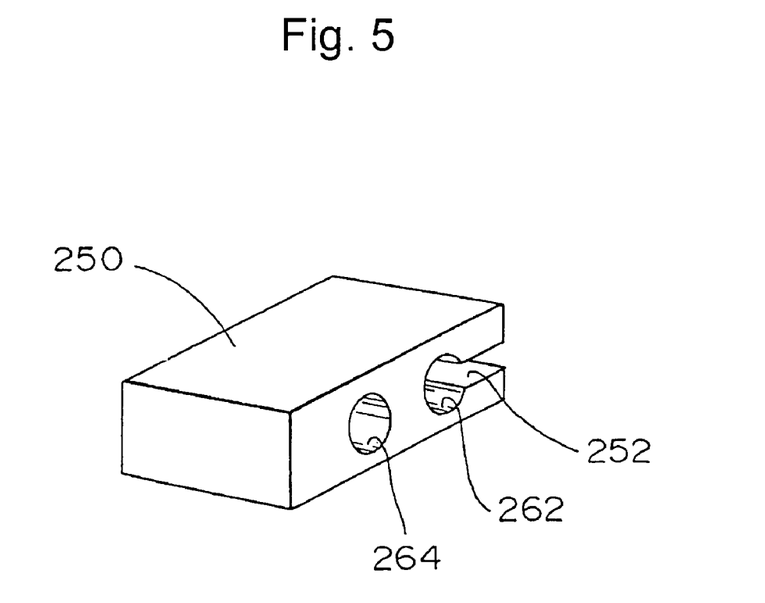
FIG. 5 is a perspective view of a connecting block for connecting the adjacent skate units in FIG. 2.

As shown in FIG. 4, the connecting block 250 is provided with two through holes, 262 and 264, through which the connecting bars 242 and 244 are inserted respectively, as shown in FIG. 5. These through holes are preferably in the shape of circular cylinders, and closely fit the circular cylindrical shapes of the connecting bars which extend through them. Hole 262 is provided with a longitudinal slot 252, the purpose of which is to permit a connecting bar 242 to be connected to, and disconnected from, the connecting block 250. Each of the connecting bars 242 has a narrowed portion 242a, formed, as shown in FIG. 3, with two opposite flat faces, joined by rounded portions which are continuous with circular, cylindrical parts of the bar. These flat faces can be formed by shaving or milling opposite sides of the bar.

As shown in FIG. 1, in the preferred embodiment of the invention, only a part of the bar 242, extending from a location near one of the side rails to an intermediate location, is narrowed. The length of the narrowed portion 242a is at least as great as the length of the longitudinal slot 252 in the connecting block 250. The narrowed portion can pass through the slot 252 when the narrowed portion is in register with the slot, and the connecting block and the bar are in a particular angular relationship such that the flat faces of the bar are parallel to the walls of the slot 252.

Figure 6:
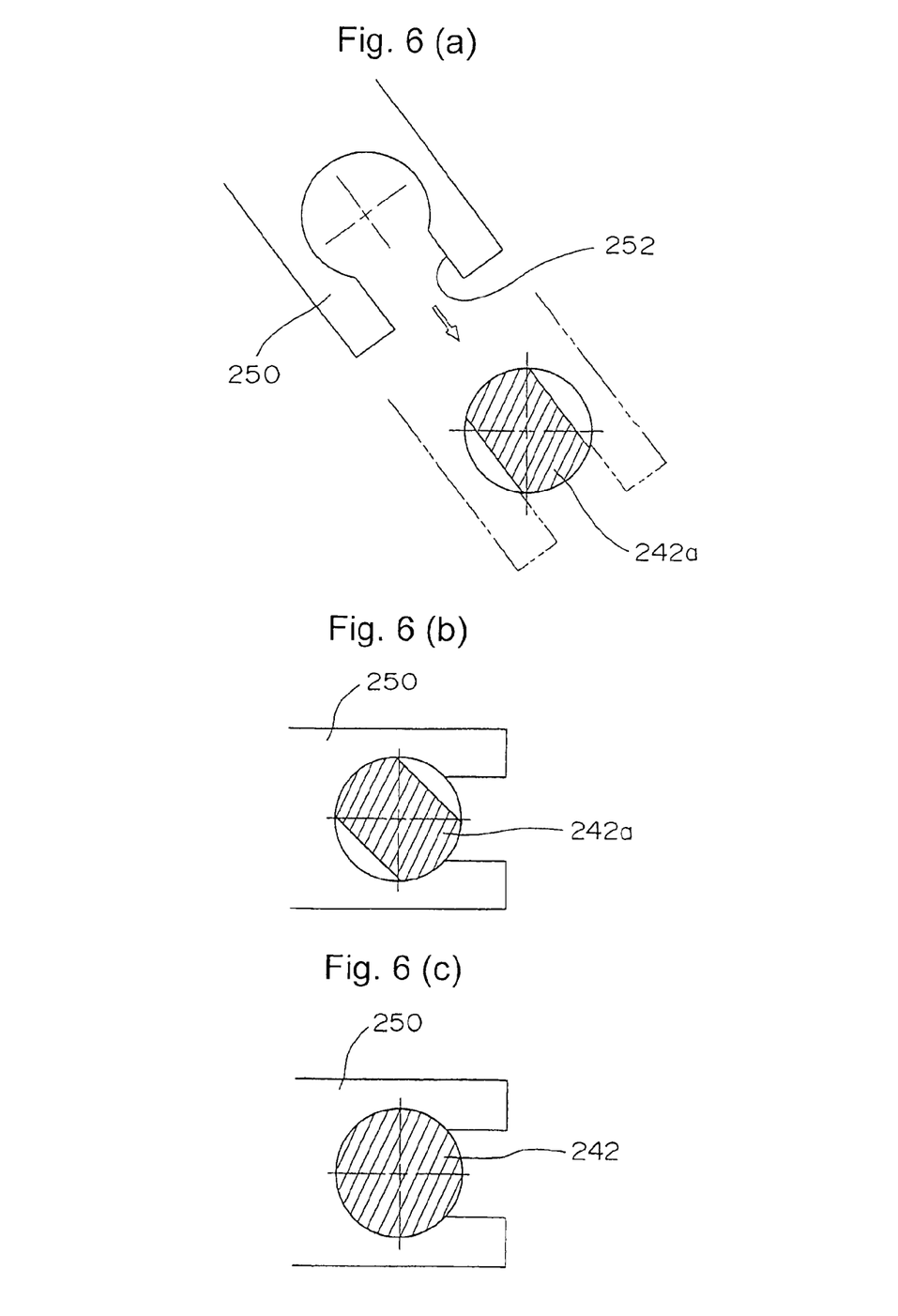
FIGS. 6(a), 6(b) and 6(c) are schematic views illustrating steps in the process of engaging a connecting block with a connecting bar in a skate according to a first embodiment of the invention.

Preferably, the faces of the narrowed part 248a of the bar are inclined at an angle of 45° relative to the longitudinal direction of the skate unit, as shown in FIG. 3. Thus, to connect one skate unit to another, a connecting block 250, on a bar 244 of one skate unit, is slid to a position such that its slot 252 faces a narrowed portion 242a of the connecting bar 242 of another skate unit. The connecting block 250 is then tilted relative to the bar 242, as shown in FIG. 6(a) so that the walls of the slot are parallel to the flat faces of the narrowed part of the bar. The bar can then enter the slot, as illustrated by the broken line representation of the block in FIG. 6(a). Thereafter, the block can be rotated relative to the bar as shown in FIG. 6(b), and the two skate units can be brought into alignment with each other. When the skate units are in alignment, the bar 242 cannot be disconnected from the connecting block. Finally by moving the connecting block 250 along the bar to a central position between the side rails, as shown in FIG. 2, a circular cylindrical part of the bar 242 is situated in hole 262 of the block, ensuring that the bar and the block are securely connected together while allowing articulating movement of the two skate units relative to the block and to each other.

After the skate units are connected, even if the connecting block 250 moves along the connecting bars 242 and 244, to a position, corresponding to FIG. 6(b), in which the narrowed portion of the bar 242 is in register with the slot 252, the skate units 200 will not become disconnected from each other unless the block is rotated through an angle of 45° relative to the bar. This rotation will not occur in normal operation of the skate. On the other hand, the block can easily be moved into register with the narrowed portion of the bar, and rotated deliberately when the skate units are to be disconnected from each other. Accordingly, connection and disconnection of the skate units can be accomplished easily.

Figure 7:
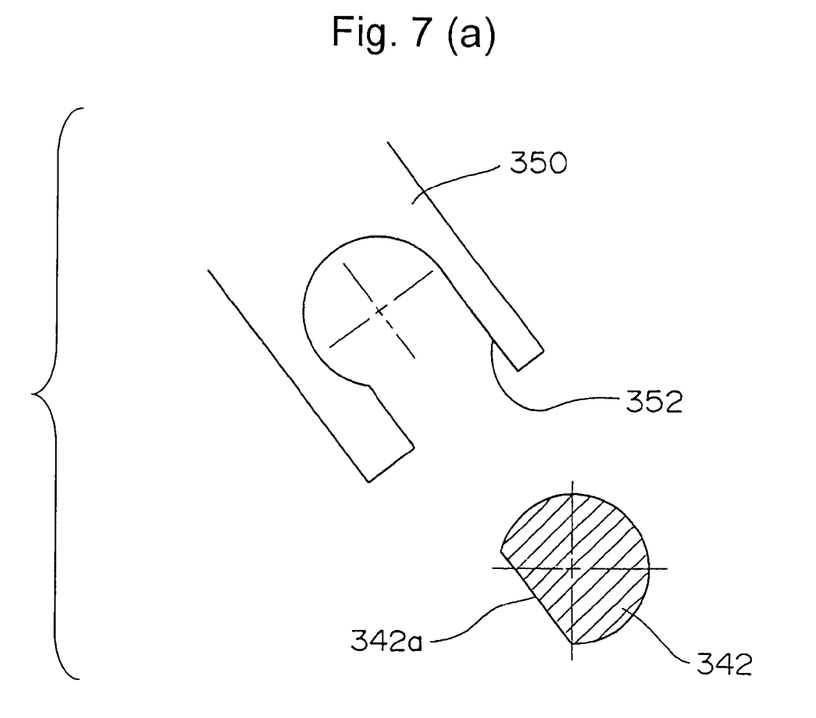
FIGS. 7(a) and 7(b) are schematic views illustrating steps in the process of engaging a connecting block with a connecting bar in a skate according to a second embodiment of the invention.

Although, in the embodiment depicted in FIGS. 1-6(c), the narrowed portion 242a is formed by shaving both sides of the connecting bar 242 as shown in FIG. 3, in an alternative embodiment, illustrated in FIGS. 7(a) and 7(b), a narrowed portion 342a can be formed by shaving only one side of a connecting bar 342. This narrowed portion 342a cooperates with a slot 352 one wall of which is tangent to a cylindrical hole in a connecting block 350, and the other wall of which intersects the cylindrical hole. As in the first embodiment, connection and disconnection of the block from the bar are accomplished by rotation of the block through an angle of 45°.

We claim:

1. A skate for a guided cable structure in which a cable extends through a flexible protective cable guide, the skate comprising:
    a plurality of skate units disposed in aligned, sequential relationship to one another along a longitudinal direction, each said skate unit comprising a pair of rails in laterally spaced, parallel relationship, and a pair of connecting bars, each extending from one rail to the other;
    rollers mounted on said rails for rolling engagement with a flexible protective cable guide; and
    a connecting block having first and second through holes, the second of said through holes having a longitudinal entry slot along its full length, the width of the entry slot being less than the diameter of said one of said through holes;
    wherein a first connecting bar of one skate unit extends through a first through hole of the connecting block, and a second connecting bar of another skate unit extend through the second hole of the connecting block, said second connecting bar having a narrowed portion along at least part of its length, the narrowed portion being narrower than the width of said slot, whereby the narrowed portion can enter the slot for engagement of the second connecting bar with said second hole and exit through said slot for disengagement of the second connecting bar from said second hole.

2. A skate according to claim 1, in which said narrowed portion extends along only a part of the length of said second connecting bar.

3. A skate according to claim 1, in which said narrowed portion extends along only a part of the length of said second connecting bar, and the length of said narrowed portion is greater than the length of said second hole.

4. A skate according to claim 1, in which said second hole is a circular, cylindrical hole, in which the width of the slot is less than the diameter of said second hole, and in which the narrowed portion of the second connecting bar has a cross-section having a width dimension in one direction narrower than the width of said slot, and a width dimension in another direction greater than the width of said slot but not greater than the diameter of said second hole.

5. A skate according to claim 1, in which said second hole is a circular, cylindrical hole, in which the slot has two opposed walls, at least one of which intersects the cylindrical hole, in which the spacing of said opposed walls from each other is less than the diameter of said second hole, and in which the narrowed portion of the second connecting bar has a cross-sectional shape defined by at least one circular, circumferential portion having a radius of curvature approximately equal to the radius of curvature of the circular, cylindrical hole, and at least one flat portion, the width of said narrowed portion of the bar, measured in a direction perpendicular to the flat portion being less than the spacing of said opposed walls.

6. A skate according to claim 5 in which said flat portion is disposed at an oblique angle with respect to said longitudinal direction, and in which said slot establishes an opening in said second hole facing in said longitudinal direction.

7. A skate according to claim 1, in which said second hole is a circular, cylindrical hole, in which the slot has two opposed walls, both of which intersect the cylindrical hole, in which the spacing of said opposed walls from each other is less than the diameter of said second hole, and in which the narrowed portion of the second connecting bar has a cross-sectional shape defined by two, opposite, circular, circumferential portions, each having a radius of curvature approximately equal to the radius of curvature of the circular, cylindrical hole, and two opposite flat portions, the width of said narrowed portion of the bar, measured in a direction perpendicular to the flat portions being less than the spacing of said opposed walls.

8. A skate according to claim 7 in which said opposite flat portions are disposed at an oblique angle with respect to said longitudinal direction, and in which said slot establishes an opening in said second hole facing in said longitudinal direction.

9. A skate according to claim 1, in which said second hole is a circular, cylindrical hole, in which the slot has two opposed walls, one of which intersects the cylindrical hole, and the other of which is tangent to the cylindrical hole, in which the spacing of said opposed walls from each other is less than the diameter of said second hole, and in which the narrowed portion of the second connecting bar has a cross-sectional shape defined by one circular, circumferential portion having a radius of curvature approximately equal to the radius of curvature of the circular, cylindrical hole, and one flat portion, the width of said narrowed portion of the bar, measured in a direction perpendicular to the flat portion being less than the spacing of said opposed walls.

10. A skate according to claim 9 in which said flat portion is disposed at an oblique angle with respect to said longitudinal direction, and in which said slot establishes an opening in said second hole facing in said longitudinal direction.

* * * * *